United States Patent [19]
Sarchet

[11] 4,066,911
[45] Jan. 3, 1978

[54] WIND-DRIVEN PRIME MOVER

[76] Inventor: Douglas P. Sarchet, Apt. 6C, 143-06 Barclay Ave., Flushing, N.Y. 11355

[21] Appl. No.: 728,927

[22] Filed: Oct. 4, 1976

[51] Int. Cl.² .......................... F03D 9/00; H02P 9/04
[52] U.S. Cl. ...................................... 290/44; 290/55; 416/133; 416/165; 416/167
[58] Field of Search ....................... 290/43, 44, 54, 55; 416/35, 133, 149, 150, 165, 148, 167

[56] References Cited

U.S. PATENT DOCUMENTS

| | | | |
|---|---|---|---|
| 786,408 | 4/1905 | Burnett | 416/133 |
| 1,334,485 | 3/1920 | Clipfell | 290/44 |
| 2,629,450 | 2/1953 | Fumagalli | 290/44 |

*Primary Examiner*—Robert K. Schaefer
*Assistant Examiner*—William Feeney
*Attorney, Agent, or Firm*—Edgar N. Jay

[57] ABSTRACT

A sail-type wind-driven prime mover is provided in which the area of the sails facing into the wind is adjustable. The prime mover comprises a drive shaft from which depend radially extending front and rear masts which support flexible sails. The area of the sails facing into the wind can be varied by moving the rear masts along and about the drive shaft while keeping the front masts fixed relative to the drive shaft. In a preferred embodiment in which the prime mover drives an electric generator, means are provided to automatically adjust the sails as a function of the output voltage of the generator.

12 Claims, 7 Drawing Figures

WIND-DRIVEN PRIME MOVER

BACKGROUND OF THE INVENTION

This invention relates generally to prime movers driven by the force of the wind and, more particularly, to a sail-type wind-driven prime mover wherein the area of the sails thereon facing the wind is automatically adjusted and regulated and in which, if desired, the sails can be readily manually adjusted.

Sail-type wind-driven prime movers for driving electric generating means are illustrated by U.S. Pat. Nos. 1,936,233 and 1,334,485. In U.S. Pat. No. 1,936,233, adjustable shutters are provided to maintain a substantially constant force on the sail elements so that the driving means will rotate at substantially constant speed. In U.S. Pat. No. 1,334,485, the sails are regulated as to position or attitude by centrifugal force.

The devices in each of these patents are of complex construction, costly to build and maintain, and regulation of the rotation of their driving means under varying wind conditions is relatively inefficient.

SUMMARY OF THE INVENTION

It is an object of the present invention to provide an improved sail-type prime mover which is automatically adjustable and responsive to (a) the varying conditions of the wind which acts as the force for driving the sail-type prime mover, in accordance with the present invention, and to (b) the varying load demands on the apparatus driven by the prime mover.

The present invention relates to a sail-type wind-driven prime mover which is especially well suited for driving accessory devices such as an electric power generator. The prime mover comprises a sail-drive assembly mounted on support means rotatable about a vertical axis preferably through 360°. The sail-drive assembly comprises a rotatably mounted drive shaft operatively associated with a plurality of sail assemblies which are rotated by the force of the wind acting thereon. Each sail assembly includes a front mast connected to the drive shaft and extending radially outward therefrom, a corresponding rear mast slidably mounted on the drive shaft and extending radially outward therefrom, a boom pivotally connected to the front mast and slidably connected to the rear mast, and a sail mounted on the front and rear masts and the boom. Control means are provided to vary the area of the sail by movement of the rear masts on the drive shaft relative to the front masts to increase sail area when higher drive shaft speed is desired and to decrease sail area when lower speed is desired. Thus, substantially constant shaft speed can be maintained at varying wind speeds or under varying load conditions by adjusting the sail area.

DESCRIPTION OF THE DRAWINGS

The foregoing, as well as additional objects and advantages of the present invention, will be apparent from the following detailed description of the preferred embodiment and the accompanying drawings in which.

DESCRIPTION OF THE PREFERRED EMBODIMENTS

Figure 1:
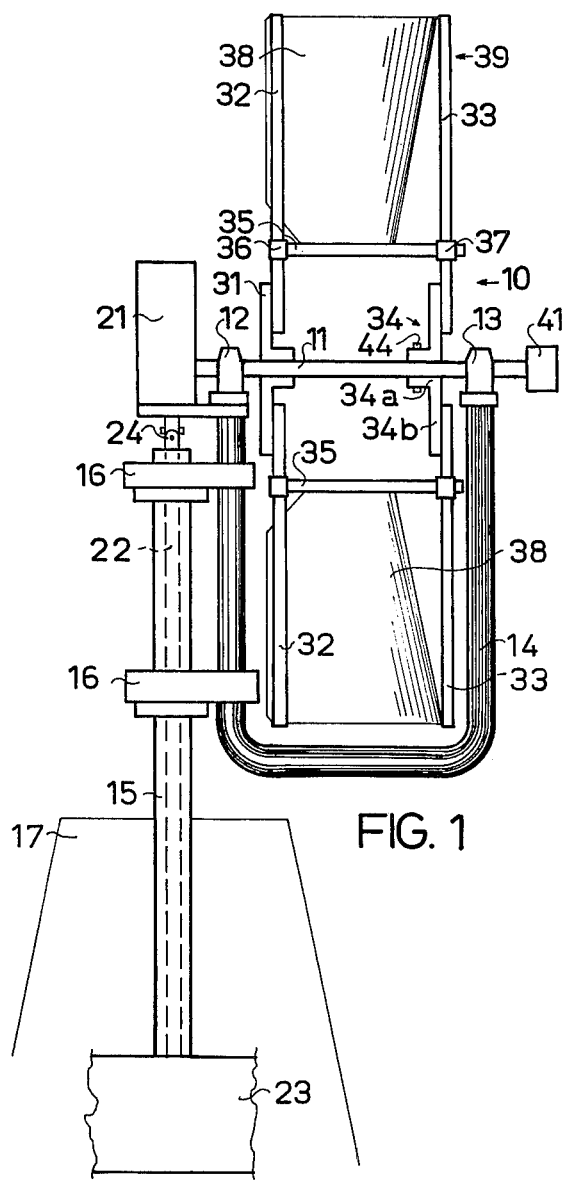
FIG. 1 is an elevational view, partially diagrammatic, of a sail-type wind-driven prime mover constructed in accordance with the present invention.

Referring to FIGS. 1 to 5, a sail-drive assembly generally designated 10 is shown comprising a tubular drive shaft 11 mounted for rotational movement as in forward and rear pillow block bearings 12 and 13. Bearings 12 and 13 are mounted on the ends of a U-shaped support frame 14 which is pivotably secured to a hollow stanchion 15 at two or more points as by swivel arms 16. The stanchion 15 is fixed to a support structure such as support tower 17, which may be mounted on the ground, the roof of a building, or any other suitable location.

The drive shaft 11 is connected to a solid shaft 20 which connects through a gear means 21 to a vertical power transfer shaft 22 which is mounted for rotation within stanchion 15. The lower part of the power transfer shaft 22 is connected to the apparatus to be driven by the sail-drive assembly 10, preferably an electromotive force generator means 23. The power transfer shaft 22 preferably includes a univeral joint 24 to allow for limited flexing during operation.

Figure 5:
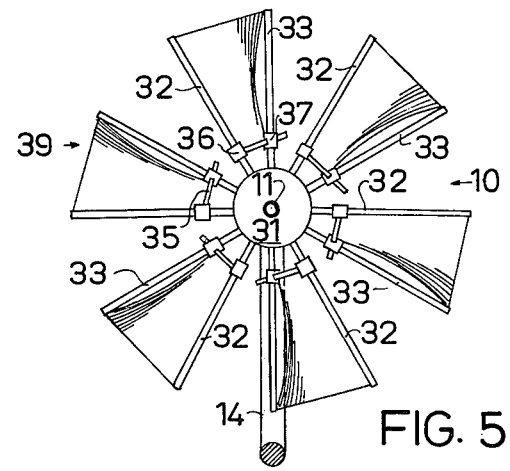
FIG. 5 is a front elevational view, partly diagrammatic and cut away for convenience, of the sail drive assembly of this invention with the sail assemblies near one extreme position to present substantially maximum surface area to the wind.

A front hub 31 is mounted on drive shaft 11 rearward of the forward bearing 12. Connected to front hub 31 and extending radially therefrom are a plurality of evenly circumferentially spaced front masts 32. As shown in FIG. 5, a preferred embodiment of this invention is provided with six such front masts 32. A rear hub 34, having a cylindrical collar portion 34a and a circular plate portion 34b extending outward from the collar, is slidably and rotatably mounted on drive shaft 11 forward of rear bearing 13 (to the left thereof as viewed in FIG. 2). A plurality of rear masts 33, one for coaction with each of the front masts 32, are mounted on the plate portion 34b of the rear hub 34. Extending between each pair of associated front and rear masts 32 and 33 is a boom 35 which is pivotally attached to the front and rear masts by front connector 36 and rear connector 37 respectively. The rear connectors 37 permit the rear masts to slide and pivot on the booms. Sails 38 which may be of either flexible or rigid construction are mounted on the front masts 32 and booms 35, and attached at their top rear corners to the rear masts 33. A sail assembly 39 is a unit comprising a front and rear mast with a boom and sail. Sail-drive assembly 10 comprises a plurality of said assemblies 39 operatively mounted on drive shaft 11. As is clearly apparent from FIG. 1, the center of gravity of the sail-drive assembly 10 is spaced radially outward from the vertical axis about which shaft 22 rotates.

Figure 4:
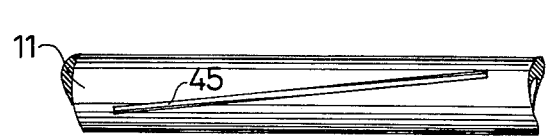
FIG. 4 is a fragmentary plan view of the drive shaft showing one guide slot.
Figure 3:
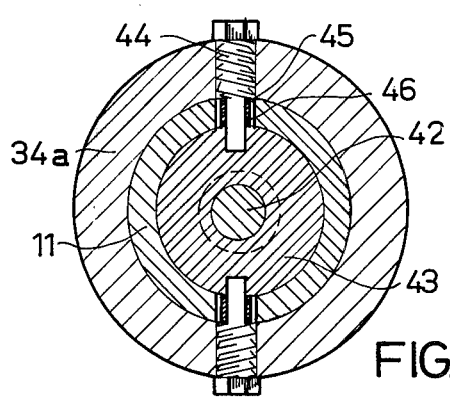
FIG. 3 is a cross-sectional view on an enlarged scale on the line 3—3 of FIG. 2.
Figure 2:
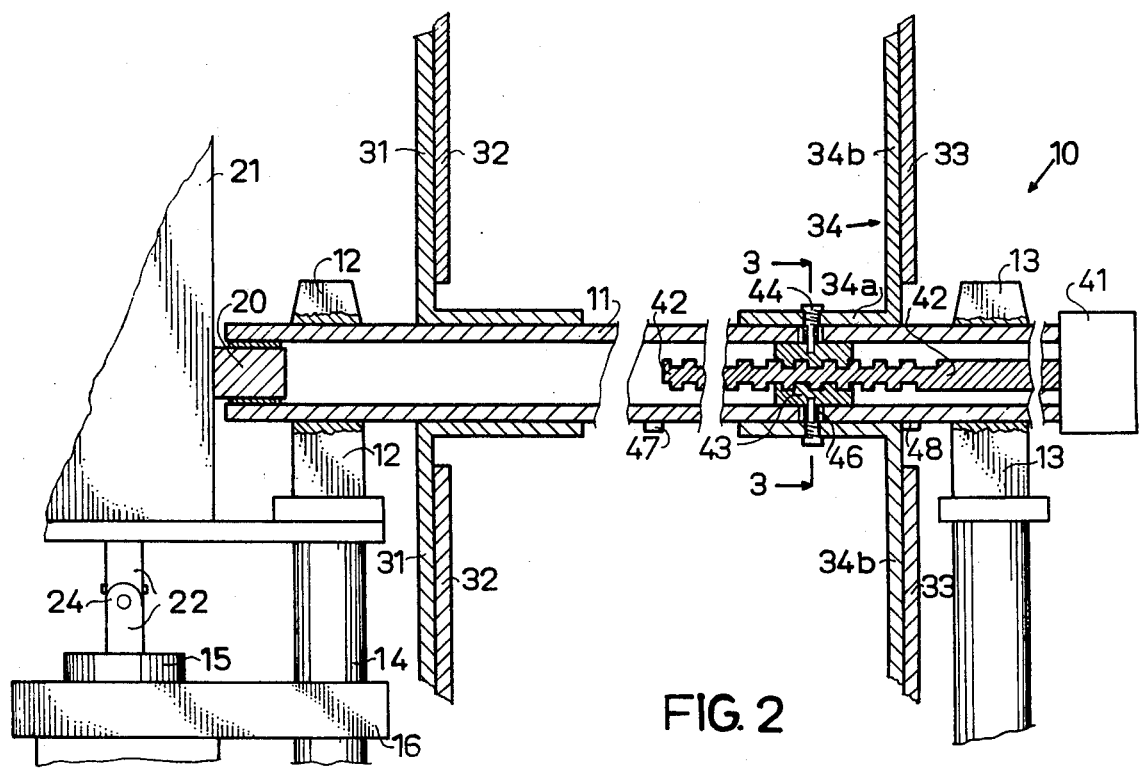
FIG. 2 is an elevational view, partially in section, on an enlarged scale of the sail control means.

Means are provided for moving rear hub 34 longitudinally along, while simultaneously rotating the same relative to drive shaft 11 for changing the amount of sail area faced into the wind. In the preferred embodiment shown, a reversible control motor 41 is supported on the rear end portion of drive shaft 11 (the right as viewed in FIG. 2).Extending within and concentric with drive shaft 11 is a rotatably mounted worm control shaft 42 connected to the output shaft of motor 41 to be driven clockwise or counterclockwise, as viewed in FIG. 3, depending on the direction of rotation of motor 41. A movable cylindrical plug 43 internally threaded or formed with a groove to engage worm control shaft 42, is slidably mounted in drive shaft 11 within that portion thereof extending in the rear hub collar portion 34a. Referring to FIGS. 2 and 3, a plurality of pins 44, preferably two as shown, connect the rear hub collar portion 34a to plug 43. A plurality of slots 45, one for each of the pins 44, is formed along drive shaft 11 with each slot 45 extending longitudinally along and partially circumferentially about drive shaft 11 as shown in FIG. 4 to permit the desired longitudinal movement and rotation of rear hub 34 relative to the drive shaft. Preferably, guide bushings 46 are provided, each of which slidably engages the walls of the slot 45 in which it is fitted.

When control motor 41 operates, it rotates control shaft 42 with respect to drive shaft 11 which may be considered fixed for the purposes of this discussion because the control motor 41 is affixed to the drive shaft 11 and rotates with it. Because the pins 44 prevent the plug 43 from rotating with control shaft 42, plug 43 is urged forward or rearward (left or right as viewed in FIGS. 1 and 2) by the rotation of control shaft 42 because of the engagement of the plug 43 by the worm shaft 42. The bushings 46, through which pins 44 extend, slide in slots 45 thus moving rear hub 34 forward or rearward. The plug 43 and rear hub 34 are also rotated with respect to the drive shaft 11 as the pins 44 are moved along the slots 45. The apparatus is so constructed that when the rear hub 34 is brought to its rearmost position, the rear masts 33 are aligned with the front masts, and, as the rear hub 34 is urged forward, the rear masts 33 are rotated so that more sail area is faced to the wind as shown in FIG. 5. Rear connectors 37 must allow the rear masts 33 to slide longitudinally along and to rotate relative to booms 35, and to allow booms 35 to pivot on rear masts 33 when the rear hub 34 moves. Front connectors 36 should be universally hinged to permit the booms 35 to pivot in both lateral and longitudinal directions relative to the front masts 32.

The operation of the apparatus of this invention as thus far described is as follows. In response to a moderate wind engaging the sail assemblies 39, the sail-drive assembly 10, if not already properly aligned, pivots on stanchion 15 until the front of the sail-drive assembly 10 is facing the wind with drive shaft 11 parallel to the wind. The wind pushes on the sails 38 which in turn rotate the drive shaft 11. The drive shaft 11 in turn drives the generator means 23 through gear means 21 and power transfer shaft 22. The speed with which the drive shaft 11 is rotated for a given wind speed is a direct function of the amount of sail area faced into the wind. The sail assemblies 39 are put into a feathered position to minimize the sail area faced into the wind, by moving the rear hub to its most rearward position, at which point the rear masts 33 are directly behind front masts 32, and the sails 38 are stretched parallel to the wind direction. In the feathered position, there is little or no rotation of the drive shaft 11. To increase the speed of rotation of the drive shaft 11 and thus to increase the amount of power being generated, control motor 41 is actuated to move rear hub 34 forward to increase the sail area facing the wind as shown in FIG. 5. A forward limit switch 47 and a rear limit switch 48 mounted on the drive shaft 11 are provided to stop the control motor 41 when the rear hub 34 has reached, respectively, its extreme forward and rearward positions. Motor 41 and limit switches 47, 48 rotate with shaft 11 and are mounted on rotatable support frame 14. Thus, rotating connectors (not shown) are used to facilitate making the electrical connections thereto.

Figure 6:
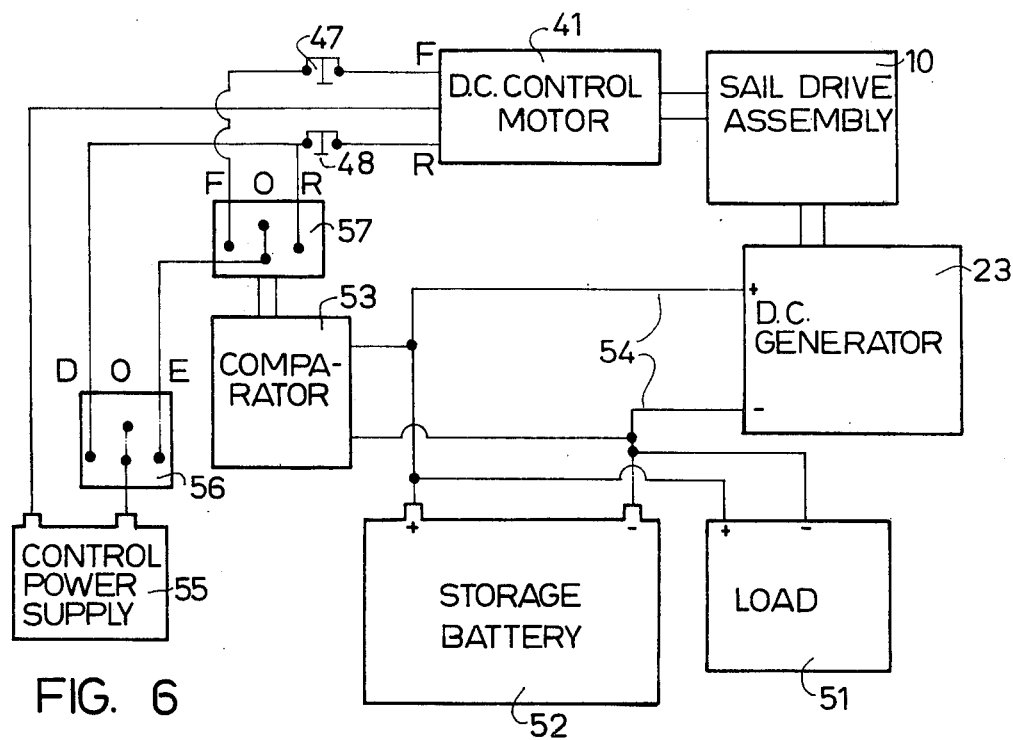
FIG. 6 is a schematic diagrammatic view of the control circuit.

Preferably, a control circuit is provided for automatically operating the control motor 41 in response to variations in wind conditions and power demand. As shown in FIG. 6 a d-c generator 23, driven by sail-drive assembly 10, is connected by power lines 54 across a load 51 and a storage battery 52 which is also connected across the load 51 for supplying power thereto when the output of the generator 23 is inadequate. Battery 52 is connected to be charged by the generator 23. A comparator 53 monitors the voltage across power lines 54 between the d-c generator 23 and the storage battery 52 or load 51, and compares the power line voltage to source of predetermined voltage and determines whether the power line voltage is above or below a predetermined level.

As shown, enable-disable switch 56 and control switch 57 are three-position switches with the center position "0" of the switch poles providing an open position. When the pole of switch 56 is on its enable, "E", contact, one side of the control power supply is connected to the pole of switch 57 which, when on its "F" contact, completes a circuit between the control power supply and the forward winding of control motor 41. When control switch 57 is shifted to its open position "0", control motor 41 is stopped, and, when the contact "R" of control switch 57 is closed, contact "E" of switch 56 being closed, a circuit is completed between the control power supply 55 and the reverse winding of control motor 41. When the pole of enable-disable switch 56 is shifted to is "D" contact, the reverse winding of control motor 41 is energized independent of the condition of control switch 57 until rear limit switch 48 is opened to break the circuit when the sails have been feathered.

While switch 57 has been described as a three-position, single-pole switch of conventional type used for automatic operation, it can also have a manual override if desired. It also can be a rheostat-type swicth which would also regulate the speed of the control motor 41 depending on the amount and the direction by which the supply line voltage differs from the predetermined value. Enable-disable switch 56, as shown, is manually operated. If desired, the switch 56 can be automaticaly controlled, to feather the sails, thus disabling the sail-drive assembly in response, for example, to a wind speed measuring means (not shown) when the wind speed is too high or too low for proper operation.

Starting with the enable-disable switch 56 in the "E" position, the control switch 57 in the "0" position, and limit switches 47 and 48 closed, the operation of the control circuit is as follows. With the limit switches 46 and 47 both closed, the rear hub 34 is in an intermediate position between its extreme forward and rearward positions. With control switch 57 in its "0" position, the voltage across power lines 54, as measured by comparator 53, is within a desired operating range so that no adjustment of the sail-drive assembly is needed. When the voltage level across lines 54 drops below a predetermined minimum, as may be the result of a decrease in wind speed or an increase in load demand, then comparator 53 shifts control switch 57 to its "F" position. Control motor 41 is thereby energized to move rear hub 34 forward until either the voltage across power lines 54 reaches a predetermined level and comparator 53 shifts control switch 57 back to its "0" position, or the rear hub 34 reaches its forwardmost position and opens limit switch 47. When the voltage across power lines 54 is determined to be too high by the comparator 53, it shifts control switch 57 to the latter's "R" position, thereby energizing control motor 41 to shift rear hub 34 rearward until the sail-drive assembly is slowed enough so that the voltage across power lines 54 is below a predetermined level whereupon control switch 57 is shifted to the "0" position, or until rear limit switch 48 is opened to interrupt the operation of the control motor 41 with the rear hub 34 in its rearwardmost position and the sails feathered.

Figure 7:
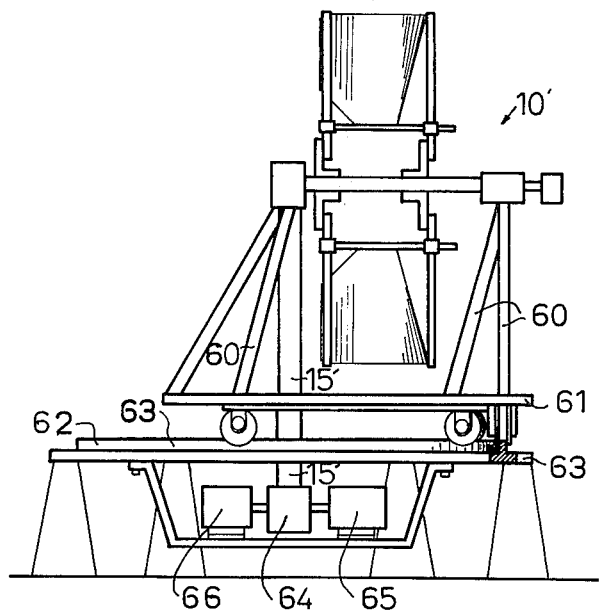
FIG. 7 is an elevational view, partially diagrammatic of another embodiment of a wind-driven prime mover constructed in accordance with the present invention.

Another embodiment of the apparatus of this invention is shown in FIG. 7 in which sail-drive assembly 10' is substantially the same as sail-drive assembly 10, but preferably carries more sail area and may be substantially larger and heavier than assembly 10. Sail-drive assembly 10' is supported by struts 60 on a carriage 61, mounted to rotate 360° about a fixed pivot formed by stanchion 15'. The outer periphery of carriage 61 is supported on a circular track 62 which is mounted concentric with stanchion 15' on support platform 63. A vertical power transfer shaft (not shown), which is within stanchion 15', extends down into gear assembly 64 to which a generator 65 is connected. Preferably, an alternative power source 66, such as an internal combustion engine, is provided to drive generator 65 when insufficient wind power is available, with gear assembly 64 providing means to connect either power source to the generator 65.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An adjustable wind-driven prime mover comprising a rotatably mounted drive shaft, a plurality of radially extending front masts connected to said drive shaft, a corresponding plurality of rear masts movably mounted on the drive shaft and extending radially outward therefrom, a corresponding plurality of boom members, each boom member being pivotally connected to a front mast and movably connected to a rear mast with the rear mast free to move longitudinally along and to rotate about its associated boom, each associated set of a front mast, rear mast and boom member forming a sail member supporting assembly, a corresponding plurality of sail members each being mounted on one of said sail member support assemblies, means for moving said rear masts relative to said front masts to adjust the area of the sail members facing into the wind, and means for controlling the operation of said moving means.

2. An apparatus as in claim 1 wherein said means for moving said rear masts comprises a hub slidably mounted on said drive shaft, said rear masts being mounted on said hub, and means for moving said hub along said drive shaft while rotating said hub about the drive shaft through a predetermined angle.

3. An apparatus as in claim 2 wherein said drive shaft has at least one guide slot formed therein which extends longitudinally along and partially circumferentially about the drive shaft through an arc corresponding to said predetermined angle, said apparatus further comprising at least one guide pin connected to said hub and extending into said guide slot.

4. An apparatus as in claim 1 in which said controlling means comprises means for measuring the output.

5. An apparatus as in claim 3 in which said controlling means comprises means for measuring the output of said prime mover and means for controlling the operation of said moving means as a function of said output.

6. An apparatus as in claim 5 in which said drive shaft comprises a tube with said slot formed through the tube wall, and in which said moving means further comprises a plug movably mounted inside said drive shaft, said guide pin extending through said guide slot and being connected to said plug, and means for moving said plug longitudinally in said drive shaft, whereby as said plug moves longitudinally along said drive shaft said guide pin follows said guide slot and moves said hub along and rotates the same relative to said drive shaft.

7. An apparatus as in claim 6 in which said movable plug has a threaded bore formed longitudinally therethrough concentric with said drive shaft and in which said moving means comprises a rotatably mounted worm shaft and a reversible electric motor for rotating said worm shaft, said worm shaft extending within and threadedly engaging said plug whereby said plug is moved longitudinally by the rotation of said motor.

8. An apparatus as in claim 7 further comprising a substantially vertically mounted stanchion, a support frame mounted for rotation about the circumference of said stanchion, wherein said drive shaft is rotatably and substantially horizontally mounted on said support frame.

9. An apparatus as in claim 8 wherein said stanchion comprises a tubular member, said apparatus further comprising a connecting shaft extending coaxially through said stanchion, said connecting shaft having an upper end and a lower end, and gear means connecting the drive shaft to the upper end of said connecting shaft, wherein the lower end of the connecting shaft is connected to a load to be driven by the prime mover.

10. An apparatus as in claim 9 wherein said support frame is pivotably mounted on said stanchion.

11. An apparatus as in claim 9 further comprising a substantially horizontal fixed support platform, wherein said stanchion extends perpendicularly through said platform and said support frame is movably mounted on said platform for pivotable movement about said stanchion.

12. An apparatus as in claim 11 further comprising a circular track mounted on top of said support concentric with said stanchion, said support frame being movably mounted on said track.

* * * * *

UNITED STATES PATENT OFFICE
CERTIFICATE OF CORRECTION

PATENT NO. : 4,066,911
DATED : January 3, 1978
INVENTOR(S) : Douglas P. Sarchet

It is certified that error appears in the above-identified patent and that said Letters Patent are hereby corrected as shown below:

Col. 2, line 59, for "said" read -- sail --.
Col. 4, line 22, after "to" read -- a --;
      line 40, for "is", second occurence, read -- its --;
      line 48, for "swicth" read -- switch --;
      line 53, for "automaticaly" read -- automatically --.
Col. 6, Pat. claim 4, line 2, after "output" and before "." insert -- of said prime mover and means for controlling the operation of said moving means as a function of said output --.

Signed and Sealed this

Twelfth Day of December 1978

[SEAL]

Attest:

RUTH C. MASON
Attesting Officer

DONALD W. BANNER
Commissioner of Patents and Trademarks